(12) United States Patent
Coffey

(10) Patent No.: US 6,955,477 B1
(45) Date of Patent: Oct. 18, 2005

(54) CIRCUIT ASSEMBLY FOR MONITORING PORT ACTIVITY AND INTEGRITY OF A MULTIPORT MEDIA CONVERTER

(75) Inventor: Joseph Coffey, Burnsville, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 844 days.

(21) Appl. No.: 09/636,171

(22) Filed: Aug. 10, 2000

(51) Int. Cl.$^7$ .................................................. G02B 6/36
(52) U.S. Cl. .............................. 385/53; 385/88; 385/92
(58) Field of Search ..................... 385/88–94, 134–137, 385/53

(56) References Cited

FOREIGN PATENT DOCUMENTS

WO    WO 92/15154     9/1992

OTHER PUBLICATIONS

"FlexPoint 1-FL/2 User Instructions" Omnitron Systems Technology, Inc., Jun. 1999.*

"5250 Copper/Fiber Slide-In-Module Media Converters", Transition Networks, 1998-1999.*
"Omnitron Announces a Complete Line of Single-Mode to Multimode Fiber Converters" Omnitron Systems Technology, Sep. 29, 1999.*
"EMC38-12, 12 Port Ethernet Media Converter User's Guide", *Cabletron Systems* 7 pages, ©Copyright Dec. 1994.
"EMC39-12, 12 Port Ethernet Media Converter User's Guide", *Cabletron Systems* 38 pages, ©Copyright Dec. 1996.
"EMC38-12, 12 Port Ethernet Media Converter User's Guide", *Cabletron Systems* 7 pages, ©Copyright Dec. 1994.
"EMC39-12, 12 Port Ethernet Media Converter User's Guide", *Cabletron Systems* 38 pages, ©Copyright Dec. 1996.

* cited by examiner

*Primary Examiner*—Ellen E. Kim
(74) *Attorney, Agent, or Firm*—Merchant & Gould P.C.

(57) ABSTRACT

A circuit assembly for monitoring port activity and integrity of a multiport media converter that is centrally located on a chassis. The circuit assembly indicates whether a fault condition exists for a selected port pair and also indicates activity and integrity of each port of the selected port pair.

80 Claims, 4 Drawing Sheets

CIRCUIT ASSEMBLY FOR MONITORING PORT ACTIVITY AND INTEGRITY OF A MULTIPORT MEDIA CONVERTER

FIELD OF THE INVENTION

The present invention relates generally to telecommunications equipment and, more particularly, to a circuit assembly for monitoring port activity and integrity of a multiport media converter.

BACKGROUND OF THE INVENTION

Various electrical/fiberoptic connectors are known for use in the telecommunications industry to transmit voice, data and video signals. FIG. 1 illustrates a prior art environment 10 in which a hub 12 is electrically coupled to a workstation 14 by conventional copper wiring, i.e., unshielded twisted pair. A disadvantage in this environment is that copper is distance limited in that it transmits signals a maximum distance of about 90–100 meters. Oftentimes the physical layout of the environment in which hubs and workstations are to be coupled requires signals to be propagated over greater distances than copper can accommodate. One way to propagate signals over greater distances is to use fiber optic cable which can propagate signals a distance of about 2 kilometers or more using either multimode or single mode optical fiber. FIG. 2 illustrates an extended environment in which fiber optic cable is used. In order to use both copper and fiber, converters must be used to convert a signal into the proper format for the transmission media, i.e. copper or fiber. In this extended environment 16, a hub 18 is electrically coupled to a media converter 20 by standard copper wiring such as an RJ45 patch cable. A workstation 22 is electrically coupled to another media converter 20 also by standard copper. The two media converters 20 are optically coupled together by fiber optic cable. This allows the hub 18 and workstation 22 to be separated by greater distances than in the environment shown in FIG. 1.

For environments where multiple hubs and/or workstations may be used, the converters 20 are generally multiport media converters that accept multiple terminations to fiber and twisted pair. The media converters 20 have ports of a first type to transmit and receive signals over twisted pair and ports of a second type to transmit and receive signals over fiber. Electronics within the media converter convert signals from one format to another. In the converter, a twisted pair port is electrically coupled to a fiber port and that pair is given a unique number. From a troubleshooting perspective it is important to be able to monitor port activity as well as its integrity, for example, is the port properly terminated.

One way of providing such monitoring is to provide indicators such as light emitting diodes (LEDs) at each port to indicate if there is activity at that port and whether the port is properly terminated. For example, in a chassis that holds sixteen port pairs, a total of 64 or more LEDs are needed. Having so many LEDs consumes valuable real estate as well as power. In addition, the user has to look at the indicators at each of the individual ports which makes troubleshooting difficult and burdensome. In addition, because the activity indicators for the copper ports and optic ports are physically located at their respective port, a troubleshooter would have to look at the indicators at a copper port and then look at the indicator at the fiber port to which that copper port is coupled.

It is thus desirable to provide a simple, easy to use monitor that utilizes a small number of indicators, is low on power consumption and has a small footprint. In addition, it is desirable to provide a monitor that centrally locates the indicators so that activity and integrity of any port can be monitored from a central location. In addition, it is desirable to place the activity indicator for each port of a port pair at the same location.

SUMMARY OF THE INVENTION

According to a first aspect of the invention, there is provided a monitor for a multiport media converter. The monitor includes a plurality of first ports and a plurality of second ports. The second ports are of a different type than the first ports and each first port is electrically coupled to a distinct second port to create a port pair. A monitor is electrically coupled to the plurality of port pairs to monitor activity at a selected port pair.

According to a second aspect of the invention there is provided a monitor having an input for receiving signals from multiple ports. The ports include a plurality of first ports of a first type and a plurality of second ports of a second type that are different than the first type. The ports are electrically coupled so that a first port is electrically coupled to a distinct second port to form a port pair. Means are electrically coupled to the input to select a port pair to monitor. A display is electrically coupled to the means for selecting and the input to display the port pair being monitored.

According to a third aspect of the invention, there is provided a monitor circuit board assembly that includes an input for receiving signals from a plurality of port pairs of a converter, a port pair selector for selecting which port pair to monitor, a monitor circuit coupled to the input and port pair selector, and a display to indicate which of a plurality of port pairs is being monitored. The monitor circuit monitors at least one condition of the port pair selected.

According to a fourth aspect of the invention, there is provided a monitor for a converter that includes an input electrically coupled to a plurality of port pairs, a switch coupled to the input for selecting one of the plurality of port pairs, a monitor circuit for monitoring at least one condition of the port pair selected and a display for displaying the port pair being monitored.

BRIEF DESCRIPTION OF THE DRAWINGS

The accompanying drawings, which are incorporated in and constitute a part of this specification, illustrate several aspects of the invention and together with the description, serve to explain the principles of the invention A brief description of the drawings is as follows.

DETAILED DESCRIPTION OF THE PREFERRED EMBODIMENTS

Reference will now be made in detail to preferred aspects of the present invention that are illustrated in the accompanying drawings. Whenever possible, the same reference numbers will be used throughout the drawings to refer to the same or like parts.

Figure 1:
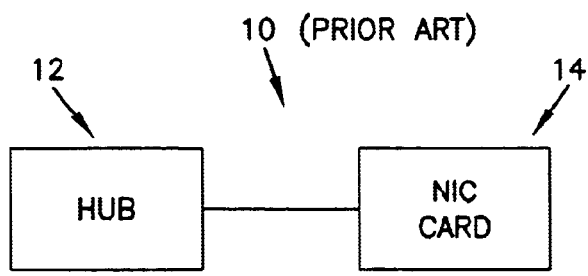
FIG. 1 is a diagram of an environment according to the prior art.
Figure 2:
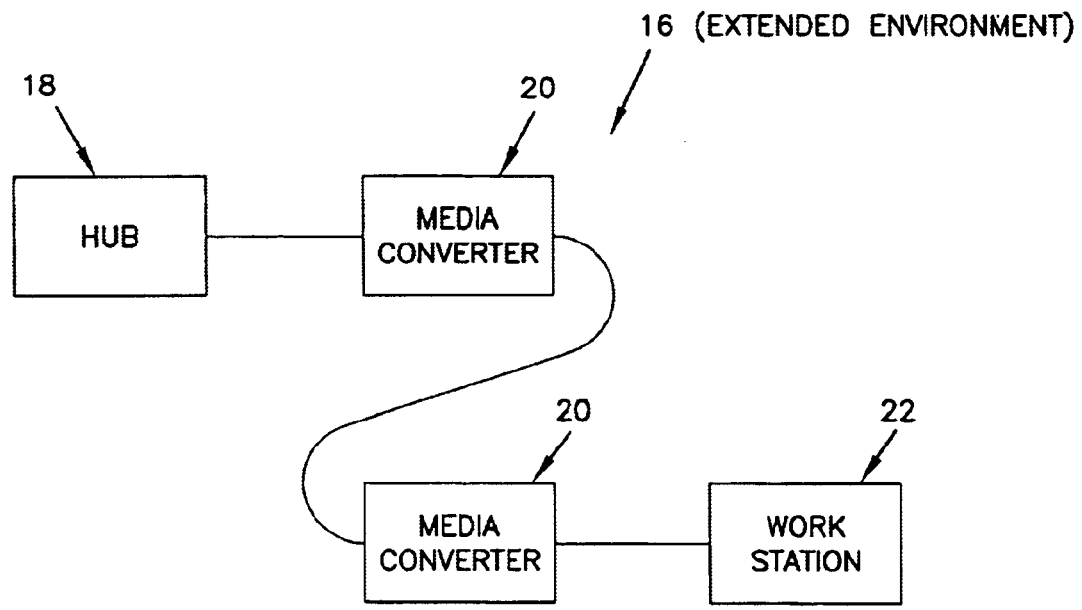
FIG. 2 is a diagram of an extended environment.
Figures 3, 4:
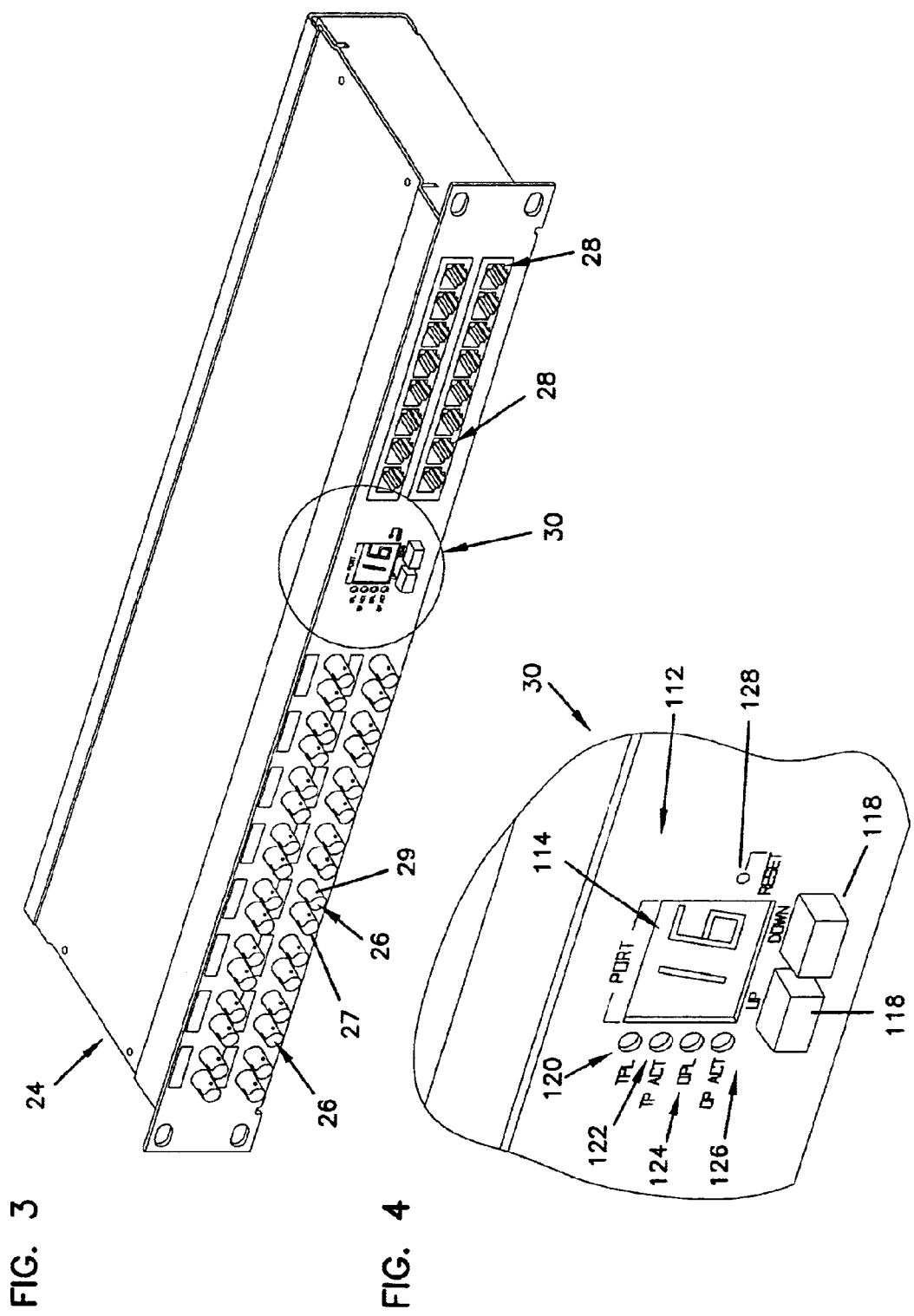
FIG. 3 is a front perspective view of a multiport media converter having a circuit assembly for monitoring port activity and integrity according to a preferred embodiment of the present invention.
FIG. 4 is a front detailed view of the circuit assembly shown in FIG. 3 according to a preferred embodiment of the present invention.

FIG. 3 is a front perspective view of a multiport media converter 24 having a circuit assembly for monitoring port activity and integrity according to a preferred embodiment of the present invention. The media converter chassis 24 holds a plurality of first ports 26 of a first type and a plurality of second ports 28 of a second type that are different from the first type. In this particular embodiment, the first ports are fiber ports that can be coupled to optic fiber (not shown) and the second ports 28 are twisted pair ports that can be coupled to unshielded twisted pair wiring (not shown, i.e. copper). Located in the center of the converter 24 is the circuit assembly 30 for monitoring port activity and integrity. From this central location, all of the ports 26, 28 can be monitored.

Figure 5:
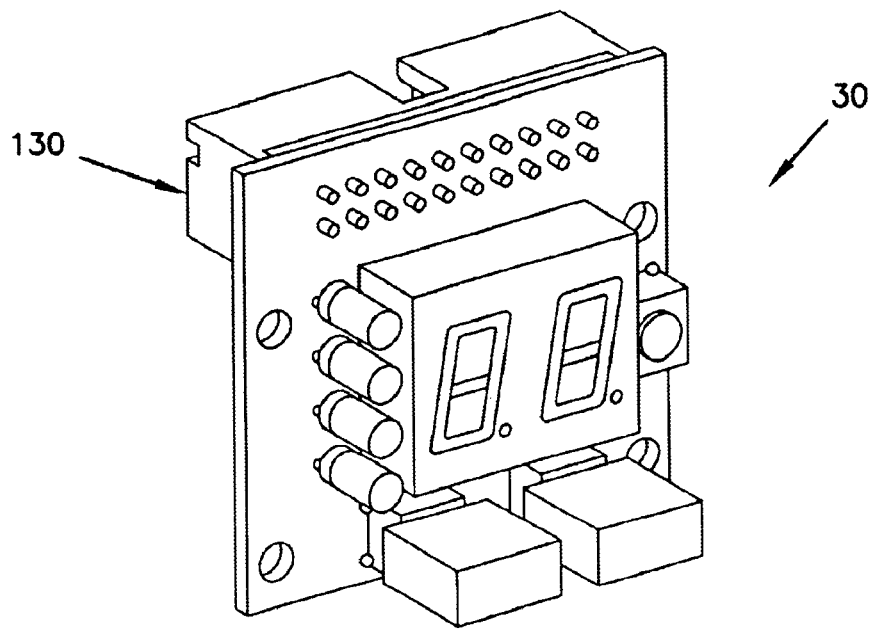
FIG. 5 is a front perspective view of the circuit shown in FIG. 3.
Figure 6:
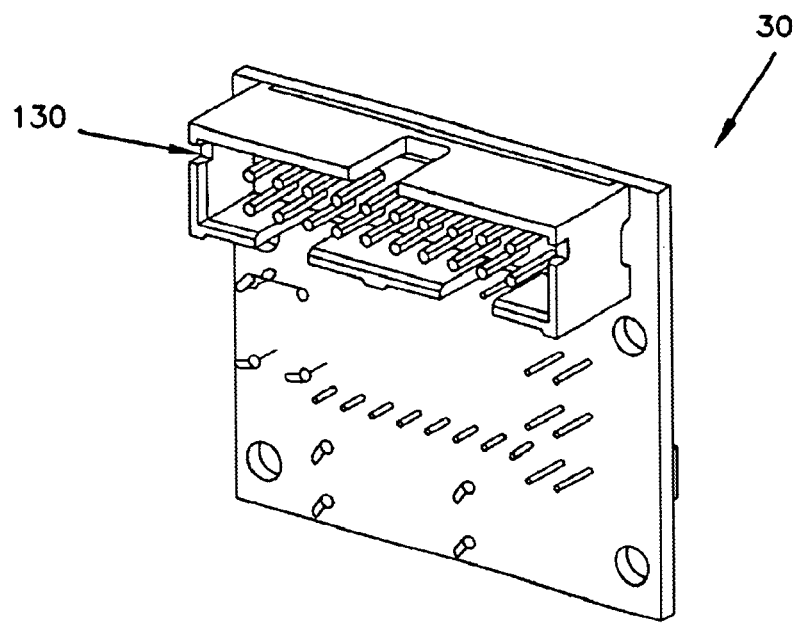
FIG. 6 is a rear perspective view of the circuit shown in FIG. 3.

FIG. 4 is a front detailed view of the circuit assembly shown in FIG. 3 according to a preferred embodiment of the present invention. The circuit assembly 30 is attached to a chassis plate 12, for example, from the backside of the chassis by a plurality of fasteners such as screws (not shown), and has a display 114, a first switch 116, a second switch 118, a first, second, third and fourth indicator, 120–126, and a reset switch 128. A detailed discussion of the circuitry of the circuit assembly will be described with reference to FIG. 7. The display 114 is preferably a digit display. Indicators 120–126 are preferably light emitting diodes. The circuit assembly 30 is electrically coupled to the ports 26, 28 through a connector (FIGS. 5–6, 130) located on the backside of the assembly which, in a preferred embodiment, is a ribbon connector. More particularly, one fiber port is electrically coupled to a twisted pair port to form a port pair. As those of ordinary skill in the art will appreciate, a fiber port refers actually to two connectors 27, 29 for transmit and receive. Each port pair is assigned a unique number. Thus fiber port "1" is coupled to twisted pair "1", for example, and is assigned the port pair number "1". Troubleshooting of the ports 26, 28 is accomplished through circuit assembly 30. A user uses the first or second switch 116, 118 to select a port pair to monitor. The number of the port pair being monitored appears on display 114. Switch 116 is used to decrease the port pair number and switch 118 is used to increase the port pair number being monitored. Of course, it will be appreciated that other switching mechanisms may be used such as a rotary dial, a single switch, a toggle switch, for example, and the present invention is not limited to the particular implementation shown.

The indicators 120–126 indicate various operational characteristics of the port pair being monitored. Indicator 120 reflects the integrity of the twisted port of the pair; i.e. is it terminated by a twisted pair patch cable. Indicator 124 does the same for the fiber port of the pair. Indicator 122 reflects whether there is any activity at the twisted pair port, i.e. is it receiving signals. Indicator 126 does the same for the fiber port of the pair.

Alternatively the display 114, indicators 120–126 and switches 116, 118 may be replaced with a liquid crystal display that is programmed to allow the user to select various information that the user is interested in seeing using the liquid crystal. The display may have a touch screen or heat sensitive panel on which icons are displayed for the users selection. In addition, while the converter has been shown converting electrical signals to optical signals and vice versa, the converter may also convert optical signals of one format to optical signals of another format, for example, single mode to multimode and vice versa. In addition, while RJ-45 jacks have been illustrated as the electrical ports, these may be replaced by coaxial connectors. Also, the optical connectors may be the type used with single mode or multimode fiber or various combinations of different connectors. The present invention is intended to cover converters that convert electrical to optical and optical to optical. In addition, the electrical connectors may be coax or RJ-45 connectors or a combination thereof and the optical connectors may be multimode or single mode or a combination thereof.

In use, a user selects which port pair to monitor using either switch 116, 118. In a preferred embodiment, switches 116, 118 are momentary switches. Alternatively, they may be replaced by a toggle switch or a dial or as previously described a touch screen liquid crystal display. The port pair number is displayed on display 114. In addition, indicators 120–126 are illuminated if there are valid links for the fiber and twisted pair ports of the port pair being monitored as well as activity at those ports. If a fault condition is encountered, i.e., no twisted pair link, no twisted pair activity, no optical link, no optical activity, the respective indicator will be extinguished and the port pair number shown in the display will flash to provide added visual stimulation that there is a problem with that port pair A reset switch 128 is used to reset the entire display circuit if a "latch-up" occurs due to user mishandling or power interruptions. The circuit assembly 30 is designed to be plugged into the backplane board (not shown) of the media converter. Thus, it can be easily removed for repair or replacement of parts, if necessary. After 60 seconds of inactivity, the display 114 and indicators 120–126 will turn off.

Thus by providing a troubleshooting monitor at a central location instead of at each port, the number of indicators is significantly reduced. By providing less indicators, power consumption is reduced by as much as 77%. Usability is also improved since a user need only look at one location instead of each port and valuable real estate is preserved. In addition, because the indicators and display are centrally located, a user can check the port activity of the paired twisted pair port and fiber port from one location.

Figure 7:
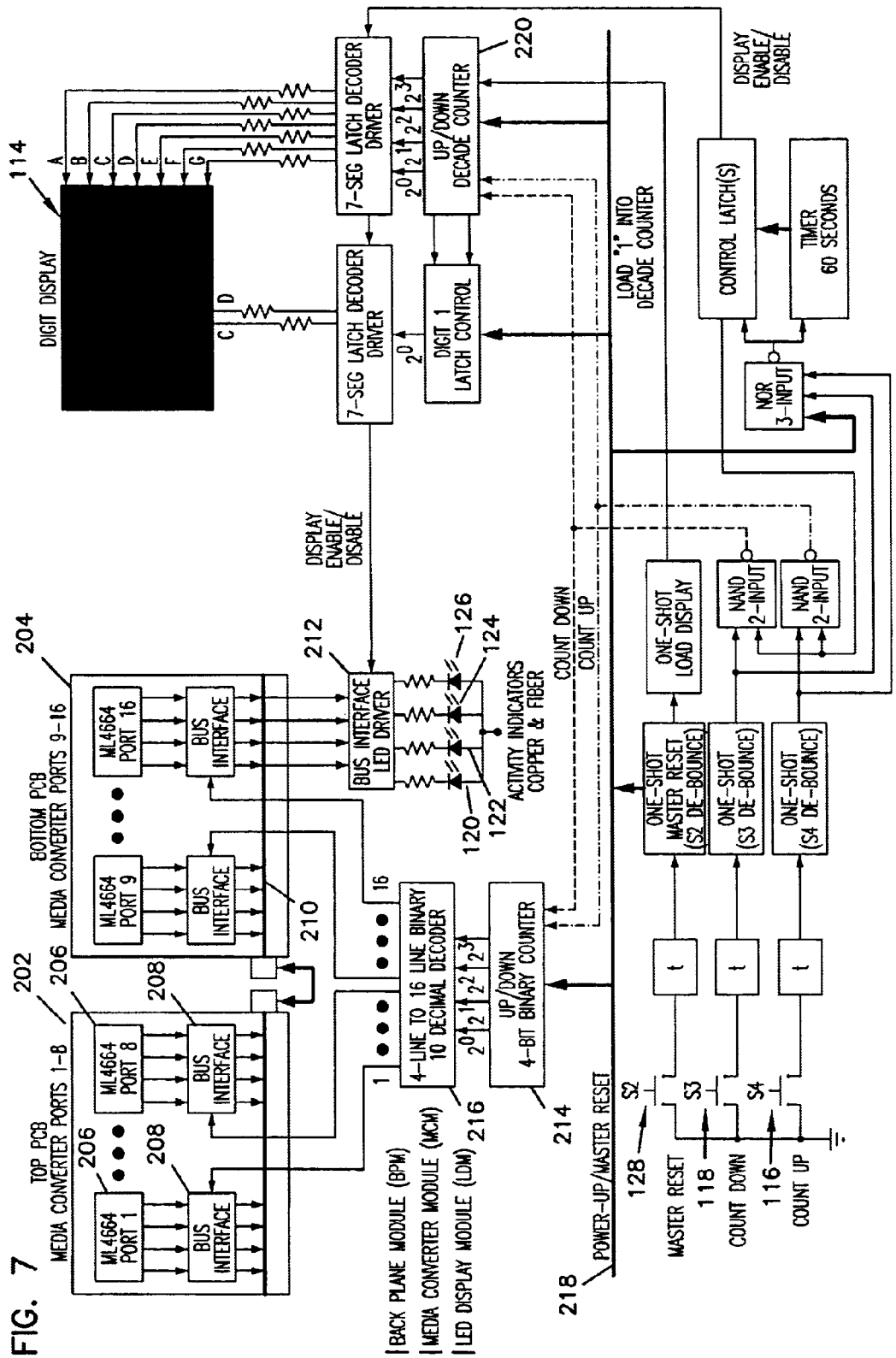
FIG. 7 is an electrical schematic of the circuit assembly shown in FIG. 3.

FIG. 7 is an electrical schematic of the circuit assembly shown in FIG. 3. The circuit 200 includes two printed circuit boards 202, 204 that couple the ports of the chassis. Converters 206 are located on the boards 202, 204 to convert signals received from and transmitted to the respective ports. A bus interface 208 is coupled to each converter. The bus interfaces 208 are coupled to a bus 210. Also coupled to the bus 210 is a bus interface LED driver 212 which drives indicators 120–126. A counter 214 and binary to decimal decoder 216 are coupled to the bus 210.

Switches 116, 118 communicate with the counter 214 and a second counter 220 to select which port pair to display and monitor. The remaining circuit elements are self explanatory and thus need not be described in further detail.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A converter comprising:
   a chassis comprising:
   a plurality of first ports;
   a plurality of second ports wherein the second ports are of a different type than the first ports and wherein each first port is electrically coupled to a distinct second port to create a plurality of port pairs; and
   a monitor electrically coupled to the plurality of port pairs to monitor information concerning a single, user-selectable port pair, the monitor including a switching mechanism for selecting a port pair to be monitored.

2. The converter of claim 1 wherein the information monitored by the monitor includes activity on the first and second port of a selected pair.

3. The converter of claim 1 wherein the information monitored by the monitor includes whether the first and second port of a selected port pair are properly terminated.

4. The converter of claim 1 wherein the plurality of first ports are electrical connectors that receive signals from copper wiring and the plurality of second ports are optic connectors that receive signals from fiber optic cables.

5. The converter of claim 1 wherein the plurality of first ports are electrical connectors that receive signals from twisted pair wiring and the plurality of second ports are optic connectors that receive signals from multimode fiber.

6. The converter of claim 1 wherein the plurality of first ports are electrical connectors that receive signals from twisted pair wiring and the plurality of second ports are optic connectors that receive signals from single mode fiber.

7. The converter of claim 1 wherein the plurality of first ports are electrical connectors that receive signals from coaxial cables and the plurality of second ports are optic connectors that receive signals from multimode fiber.

8. The converter of claim 1 wherein the plurality of first ports are electrical connectors that receive signals from coaxial cables and the plurality of second ports are optic connectors that receive signals from single mode fiber.

9. The converter of claim 1 wherein the plurality of first ports are optical connectors that receive signals from single mode fiber and the plurality of second ports are optical connectors that receive signals from multimode fiber.

10. The converter of claim 1 wherein the plurality of first ports are RJ-45 jacks and the plurality of second ports are fiberoptic connectors.

11. The converter of claim 1 wherein the monitor further comprises a display for displaying the selected port pair being monitored.

12. The converter of claim 11 wherein the display is a digit display.

13. The converter of claim 11 wherein the display is a liquid crystal display.

14. The converter of claim 11 wherein the display flashes if a fault condition exists for the port pair being monitored.

15. The converter of claim 1 wherein the switching mechanism comprises a switch for selecting a port pair to be monitored.

16. The converter of claim 15 wherein the switch is a toggle switch.

17. The converter of claim 15 wherein the switch includes a pair of switches.

18. The converter of claim 17 wherein the pair of switches are momentary switches.

19. The converter of claim 1 further comprising a plurality of indicators for indicating activity on the selected port pair being monitored and termination of first and second port of the selected port pair being monitored.

20. The converter of claim 19 wherein the plurality of indicators are light emitting diodes.

21. The converter of claim 1 wherein the monitor is detachably coupled to the chassis.

22. The converter of claim 1 wherein the plurality of first ports are grouped together in a first group and the plurality of second ports are grouped together in a second group that is located away from the first group.

23. The converter of claim 22 wherein the monitor is located between the first and second group.

24. A monitor comprising:
   an input for receiving signals from multiple ports wherein the ports include a plurality of first ports of a first type and a plurality of second ports of a second type that are different than the first type wherein the ports are electrically coupled so that a first port is electrically coupled to a distinct second port to form a port pair;
   means electrically coupled to the input for switching user-selection of a single port pair to monitor; and
   a display electrically coupled to the means for switching user-selection and the input to display the port pair being monitored.

25. The monitor of claim 24 wherein the display also displays whether a fault condition is present for the port pair being monitored.

26. The monitor of claim 24 further comprising:
   an indicator electrically coupled to the means for switching user-selection wherein the indicator indicates a condition about the port pair being monitored.

27. The monitor of claim 26 wherein the indicator is a light emitting diode.

28. The monitor of claim 24 wherein each port pair is assigned a unique number and the display is a light emitting digit display that displays the unique number of the port pair being monitored.

29. The monitor of claim 24 wherein the means for switching user-selection is a switch.

30. The monitor of claim 24 wherein the means for switching user-selection is a pair of momentary switches.

31. The monitor of claim 24 wherein the first ports are RJ-45 ports and the second ports are fiber optic ports.

32. The monitor of claim 24 wherein the plurality of first ports are electrical connectors that receive signals from twisted pair wiring and the plurality of second ports are optic connectors that receive signals from multimode fiber.

33. The monitor of claim 24 wherein the plurality of first ports are electrical connectors that receive signals from twisted pair wiring and the plurality of second ports are optic connectors that receive signals from single mode fiber.

34. The monitor of claim 24 wherein the plurality of first ports are electrical connectors that receive signals from coaxial cables and the plurality of second ports are optic connectors that receive signals from multimode fiber.

35. The monitor of claim 24 wherein the plurality of first ports are electrical connectors that receive signals from coaxial cables and the plurality of second ports are optic connectors that receive signals from single mode fiber.

36. The monitor of claim 24 wherein the plurality of first ports are optical connectors that receive signals from single mode fiber and the plurality of second ports are optical connectors that receive signals from multimode fiber.

37. The monitor of claim 24 wherein the display is a digit display.

38. The monitor of claim 24 wherein the display is a liquid crystal display.

39. A monitor circuit board assembly comprising:
- an input for receiving signals from a plurality of port pairs of a converter;
- a port pair selector for allowing user-selection of which single port pair to monitor, wherein the port pair selector includes a switching mechanism;
- a monitor circuit coupled to the input and port pair selector wherein the monitor circuit monitors at least one condition of the port pair selected; and
- a display to indicate which of a plurality of port pairs is being monitored.

40. The assembly of claim 39 wherein the display also displays a fault condition on the port pair being monitored.

41. The assembly of claim 39 wherein the display is an LED digit display.

42. The assembly of claim 39 wherein the display is a liquid crystal display.

43. The assembly of claim 39 wherein the switching mechanism is a switch.

44. The assembly of claim 39 wherein the switching mechanism is a pair of switches.

45. The assembly of claim 44 wherein the pair of switches are momentary switches.

46. The assembly of claim 39 wherein the plurality of port pairs includes first electrical ports that receive signals from twisted pair wiring and a plurality of second optical ports that receive signals from multimode fiber.

47. The assembly of claim 39 wherein the plurality of port pairs includes first electrical ports that receive signals from twisted pair writing and a plurality of second optical ports that receive signals from single mode fiber.

48. The assembly of claim 39 wherein the plurality of port pairs includes first electrical ports that receive signals from coaxial cables and a plurality of second optical ports that receive signals from multimode fiber.

49. The assembly of claim 39 wherein the plurality of port pairs includes first electrical ports that receive signals from coaxial cables and a plurality of second optical ports that receive signals from single mode fiber.

50. The assembly of claim 39 wherein the plurality of port pairs includes first optical ports that receive signals from single mode fiber and a plurality of second optical ports that receive signals from multimode fiber.

51. A monitor for a converter, the monitor comprising:
- an input electrically coupled to a plurality of port pairs wherein each of the port pairs includes a port of a first type electrically coupled to a port of a second type wherein the first type accepts signals in a different format than the second type;
- a selector coupled to the input for allowing user-selection of one of the plurality of port pairs to monitor, wherein the selector includes a switching mechanism;
- a monitor circuit for monitoring at least one condition of the port pair selected; and
- a display coupled to the input for displaying the port pair being monitored and whether a fault condition is present at that port pair being monitored.

52. The monitor of claim 51 further comprising a plurality of indicators coupled to the input wherein each of the plurality of indicators indicates a particular type of fault condition for the twisted pair being monitored.

53. The monitor of claim 51 wherein the plurality of first ports are electrical connectors that receive signals from twisted pair wiring and the plurality of second ports are optic connectors that receive signals from multimode fiber.

54. The monitor of claim 51 wherein the plurality of first ports are electrical connectors that receive signals from twisted pair writing and the plurality of second ports are optic connectors that receive signals from single mode fiber.

55. The monitor of claim 51 wherein the plurality of first ports are electrical connectors that receive signals from coaxial cables that the plurality of second ports are optic connectors that receive signals from multimode fiber.

56. The monitor of claim 51 wherein the plurality of first ports are electrical connectors that receive signals from coaxial cables and the plurality of second ports are optic connectors that receive signals from single mode fiber.

57. The monitor of claim 51 wherein the plurality of first ports are optical connectors that receive signals from single mode fiber and the plurality of second ports are optical connectors that receive signals from multimode fiber.

58. The monitor of claim 51 wherein the display is a digit display.

59. The monitor of claim 51 wherein the display is a liquid crystal display.

60. The monitor of claim 51 wherein the switching mechanism is a switch.

61. The monitor of claim 51 wherein the switching mechanism includes a pair of switches.

62. The monitor of claim 61 wherein the pair of switches are momentary switches.

63. A converter comprising:
- a chassis comprising:
- a plurality of first ports;
- a plurality of second ports wherein the second ports are of a different type than the first ports and wherein each first port is electrically coupled to a distinct second port to create a plurality of port pairs; and
- a monitor electrically coupled to the plurality of port pairs to monitor information concerning a selected port pair;
- wherein the monitor further comprises a display for displaying the selected port pair being monitored, wherein the display is a liquid crystal display.

64. A converter comprising:
- a chassis comprising:
- a plurality of first ports;
- a plurality of second ports wherein the second ports are of a different type than the first ports and wherein each first port is electrically coupled to a distinct second port to create a plurality of port pairs; and
- a monitor electrically coupled to the plurality of port pairs to monitor information concerning a selected port pair;
- wherein the monitor further comprises a switch for selecting a port pair to be monitored.

65. The converter of claim 64 wherein the switch is a toggle switch.

66. The converter of claim 64 wherein the switch includes a pair of switches.

67. The converter of claim 66 wherein the pair of switches are momentary switches.

68. A monitor comprising:
- an input for receiving signals from multiple ports wherein the ports include a plurality of first ports of a first type and a plurality of second ports of a second type that are different than the first type wherein the ports are electrically coupled so that a first port is electrically coupled to a distinct second port to form a port pair;
- means electrically coupled to the input for selecting a port pair to monitor; and
- a display electrically coupled to the means for selecting and the input to display the port pair is being monitored;

wherein each port pair is assigned a unique number and the display is a light emitting digit display that displays the unique number of the port pair being monitored.

69. A monitor comprising:
an input for receiving signals from multiple ports wherein the ports include a plurality of first ports of a first type and a plurality of second ports of a second type that are different than the first type wherein the ports are electrically coupled so that a first port is electrically coupled to a distinct second port to form a port pair;
means electrically coupled to the input for selecting a port pair to monitor; and
a display electrically coupled to the means for selecting and the input to display the port pair is being monitored;
wherein the means for selecting is a switch.

70. A monitor comprising:
an input for receiving signals from multiple ports wherein the ports include a plurality of first ports of a first type and a plurality of second ports of a second type that are different than the first type wherein the ports are electrically coupled so that a first port is electrically coupled to a distinct second port to form a port pair;
means electrically coupled to the input for selecting a port pair to monitor; and
a display electrically coupled to the means for selecting and the input to display the port pair is being monitored;
wherein the means for selecting is a pair of momentary switches.

71. A monitor comprising:
an input for receiving signals from multiple ports wherein the ports include a plurality of first ports of a first type and a plurality of second ports of a second type that are different than the first type wherein the ports are electrically coupled so that a first port is electrically coupled to a distinct second port to form a port pair;
means electrically coupled to the input for selecting a port pair to monitor; and
a display electrically coupled to the means for selecting and the input to display the port pair is being monitored;
wherein the display is a liquid crystal display.

72. A monitor circuit board assembly comprising:
an input for receiving signals from a plurality of port pairs of a converter;
a port pair selector for selecting which port pair to monitor;
a monitor circuit coupled to the input and port pair selector wherein the monitor circuit monitors at least one condition of the port pair selected; and
a display to indicate which of a plurality of port pairs is being monitored;
wherein the display is an LED digit display.

73. A monitor circuit board assembly comprising:
an input for receiving signals from a plurality of port pairs of a converter;
a port pair selector for selecting which port pair to monitor;
a monitor circuit coupled to the input and port pair selector wherein the monitor circuit monitors at least one condition of the port pair selected; and
a display to indicate which of a plurality of port pairs is being monitored;
wherein the display is a liquid crystal display.

74. A monitor circuit board assembly comprising:
an input for receiving signals from a plurality of port pairs of a converter;
a port pair selector for selecting which port pair to monitor;
a monitor circuit coupled to the input and port pair selector wherein the monitor circuit monitors at least one condition of the port pair selected; and
a display to indicate which of a plurality of port pairs is being monitored;
wherein the port pair selector is a switch.

75. A monitor circuit board assembly comprising:
an input for receiving signals from a plurality of port pairs of a converter;
a port pair selector for selecting which port pair to monitor;
a monitor circuit coupled to the input and port pair selector wherein the monitor circuit monitors at least one condition of the port pair selected; and
a display to indicate which of a plurality of port pairs is being monitored;
wherein the port pair selector is a pair of switches.

76. A monitor circuit board assembly comprising:
an input for receiving signals from a plurality of port pairs of a converter;
a port pair selector for selecting which port pair to monitor;
a monitor circuit coupled to the input and port pair selector wherein the monitor circuit monitors at least one condition of the port pair selected; and
a display to indicate which of a plurality of port pairs is being monitored;
wherein the pair of switches are momentary switches.

77. A monitor for a converter, the monitor comprising:
an input electrically coupled to a plurality of port pairs wherein each of the port pairs includes a port of a first type electrically coupled to a port of a second type wherein the first type accepts signals in a different format than the second type;
a selector coupled to the input for selecting one of the plurality of port pairs to monitor;
a monitor circuit for monitoring at least one condition of the port pair selected; and
a display coupled to the input for displaying the port pair being monitored and whether a fault condition is present at that port pair being monitored;
wherein the display is a liquid crystal display.

78. A monitor for a converter, the monitor comprising:
an input electrically coupled to a plurality of port pairs wherein each of the port pairs includes a port of a first type electrically coupled to a port of a second type wherein the first type accepts signals in a different format than the second type;
a selector coupled to the input for selecting one of the plurality of port pairs to monitor;
a monitor circuit for monitoring at least one condition of the port pair selected; and
a display coupled to the input for displaying the port pair being monitored and whether a fault condition is present at that port pair being monitored;
wherein the selector is a switch.

79. A monitor for a converter, the monitor comprising:
an input electrically coupled to a plurality of port pairs wherein each of the port pairs includes a port of a first type electrically coupled to a port of a second type wherein the first type accepts signals in a different format than the second type;

a selector coupled to the input for selecting one of the plurality of port pairs to monitor;

a monitor circuit for monitoring at least one condition of the port pair selected; and a display coupled to the input for displaying the port pair being monitored and whether a fault condition is present at that port pair being monitored;

wherein the selector includes a pair of switches.

80. A monitor for a converter, the monitor comprising:

an input electrically coupled to a plurality of port pairs wherein each of the port pairs includes a port of a first type electrically coupled to a port of a second type wherein the first type accepts signals in a different format than the second type;

a selector coupled to the input for selecting one of the plurality of port pairs to monitor;

a monitor circuit for monitoring at least one condition of the port pair selected; and a display coupled to the input for displaying the port pair being monitored and whether a fault condition is present at that port pair being monitored;

wherein the pair of switches are momentary switches.

* * * * *